(12) United States Patent
Huang

(10) Patent No.: US 6,326,607 B1
(45) Date of Patent: Dec. 4, 2001

(54) CALIBRATION DEVICE AND METHOD OF A SCANNER

(75) Inventor: Yin-Chun Huang, Hsin-Chu (TW)

(73) Assignee: Umax Data Systems Inc., Hsinchu (TW)

( * ) Notice: Subject to any disclaimer, the term of this patent is extended or adjusted under 35 U.S.C. 154(b) by 0 days.

(21) Appl. No.: 09/335,488

(22) Filed: Jun. 18, 1999

(51) Int. Cl.$^7$ ........................................ H01J 3/14

(52) U.S. Cl. ..................... 250/216; 250/234; 358/471

(58) Field of Search ........................ 250/216, 208.1, 250/234, 235, 236, 239; 358/406, 471, 474

(56) References Cited

U.S. PATENT DOCUMENTS

| 5,336,976 | * | 8/1994 | Webb et al. | 315/134 |
| 5,895,913 | * | 4/1999 | Christensen | 250/208.1 |

* cited by examiner

*Primary Examiner*—John R. Lee
*Assistant Examiner*—Kevin Pyo
(74) *Attorney, Agent, or Firm*—Bacon & Thomas, PLLC

(57) ABSTRACT

A calibrating apparatus for scanner in searching for reference of absolute or relativistic position is disclosed. The calibrating apparatus includes a cross-sectional area that generates a drop in elevation and creates a border between dark area and light are in photograph. The cross-sectional area can be formed by using the rib in housing formation or creation of trench. Furthermore, a white calibration target is included.

10 Claims, 5 Drawing Sheets

CALIBRATION DEVICE AND METHOD OF A SCANNER

BACKGROUND OF THE INVENTION

1. Field of the Invention

The present invention relates to a calibrating apparatus and method, and more particularly to a calibration target in a scanner.

2. Description of the Prior Art

FIG. 1 shows the external features of a scanner wherein machine base 30 includes main component parts such as, light source, sensors, analog-to-digital converter, amplifier and I/O interface. The material of transparent glass 40 on housing 20 can be replaced by other transparent materials, such as acrylic resin. Picture for scanning is downward on transparent glass 40, and lid 10 covers picture to scan where scanning direction is from A to A'.

FIG. 2 shows the inside structure of housing 20 in FIG. 1. Picture for scanning is upward under transparent glass 40. Because a dark-white calibration is necessary before scanning, a calibration target 60 is in the housing 20 of a scanner where the calibration target 60 in the front of transparent glass 40 is perpendicular to scanning direction.

The scanning direction is from A to A', and scanning order is calibration target to picture in sequence.

The structure of calibration target is a white calibrating area and a dark calibrating area, as shown in FIG. 3. The white calibrating area gives sensors white calibration and steady output, and also defines the brightness of photography. The border between white calibrating area and dark calibrating area is set up the reference of scanning origin, because distance between the border and scanning document can be determined. The dark calibrating area does not provide dark calibration. The scanning direction in calibration target is from white calibrating area 62 to dark calibrating area 64.

The fabrication of calibration target is that prints a long black bar in white board and paste on the transparent glass after appropriately cutting. However, system will have higher tolerance after cutting and sticking. Moreover, the cutting process will make more scrap materials higher cost in materials.

SUMMARY OF THE INVENTION

The present invention provides a cross-sectional area for calibration target to substitute dark calibrating area. Because cross-sectional area is formed with housing, the white board dose not need to print black bar and cost is down. Moreover, steps of process and assembler tolerance are reduced.

In one embodiment, the cross-sectional area for calibration target is formed by using housing formation in which cross-sectional area can be one of the rib on housing or trench in design. The dark calibrating area is substituted by a cross-sectional area that generates a drop in elevation and creates a border between dark area and light. The actual output by this invention is equivalent to prior art.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Figure 1:
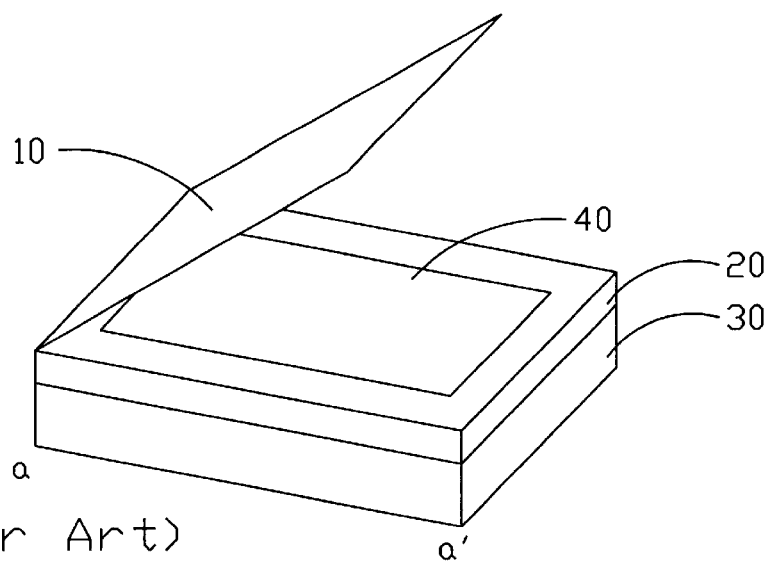
FIG. 1 shows the external features of a scanner.
Figure 2:
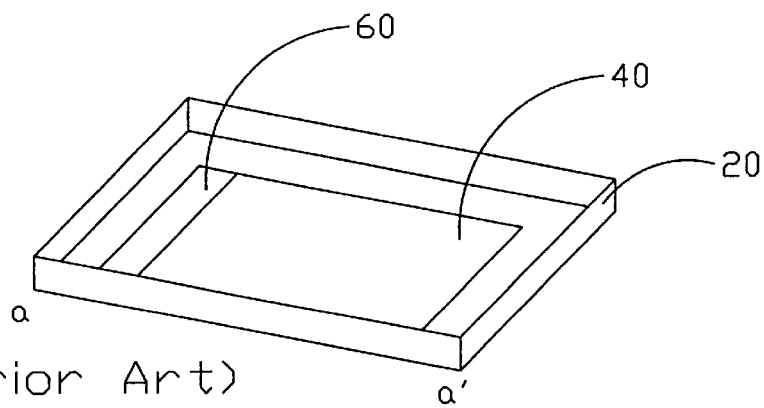
FIG. 2 shows the inside structure of housing.
Figure 3:
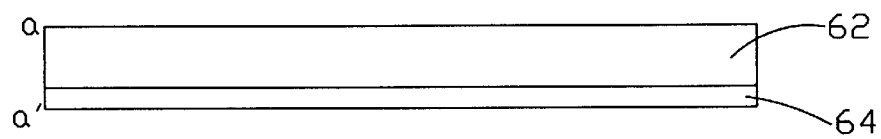
FIG. 3 is a schematic diagram of a calibration target.
Figure 4A:
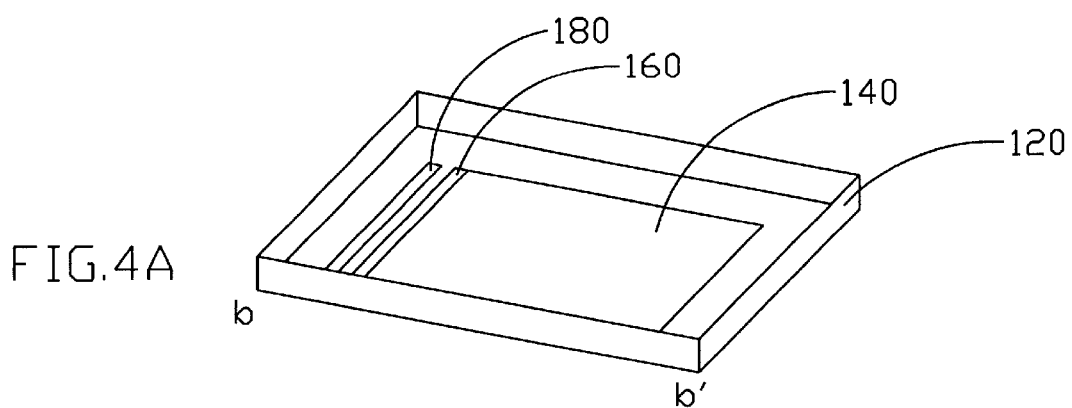
FIG. 4a shows a preferred embodiment of this invention.

The following is the preferred embodiment of this invention. The cross-sectional area of this invention has two types. One is protuberant rib and the other is indented trench. FIG. 4a shows the interior structure of housing 120 in which transparent glass 140 is in center, picture for scanning is upward under transparent glass 140, a white calibration area 160 is placed beside transparent glass 140 near B, and a rib 180 is distanced to white calibration area 160.

Figure 4B:
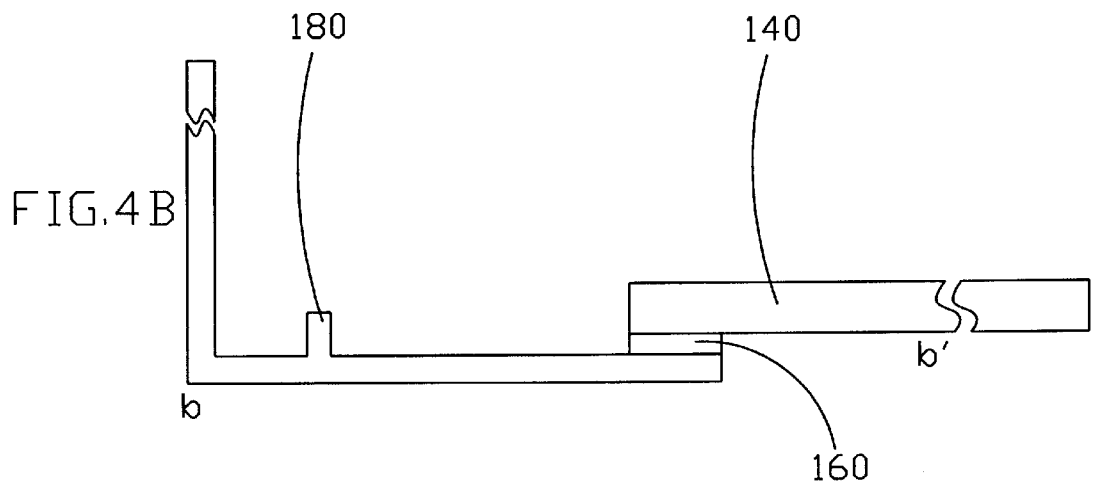
FIG. 4b shows a cross-section diagram of the preferred embodiment of this invention.

Referring to FIG. 4b, a rib 180 that is formed with housing 120 formation is perpendicular to the scanning direction. Transparent glass 140 is placed in the center of housing 120 and a white calibration area is attached below transparent glass 140 near B. Calibrating target is rib 180 plus white calibration area 160 in this embodiment.

Figure 5A:
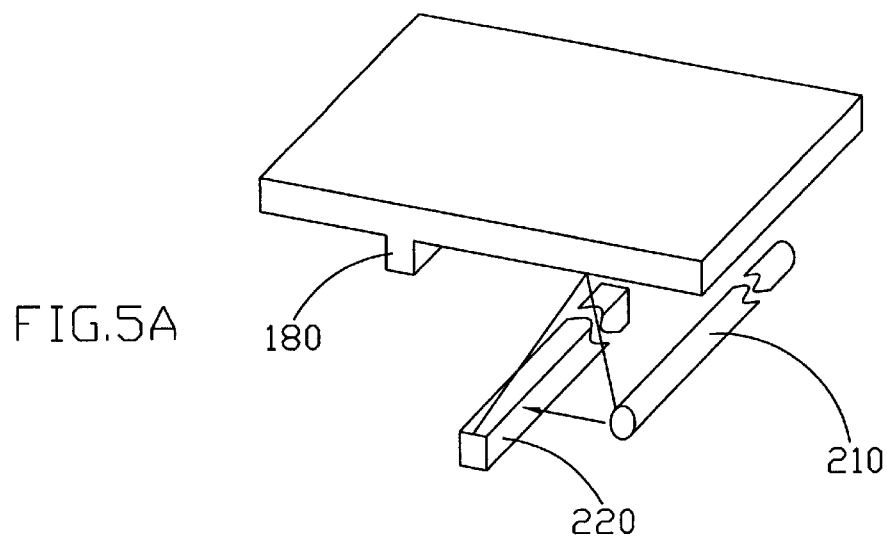
FIG. 5a is a schematic diagram illustrating a scanner in practicing the present invention of a preferred embodiment.
Figure 5B:
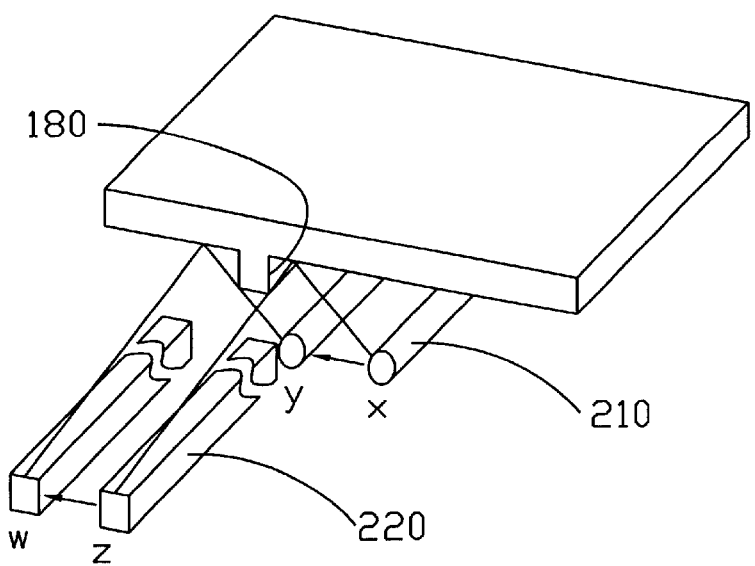
FIG. 5b is a schematic diagram illustrating the shadow region produced by light sensors passing through rib.
Figure 5C:
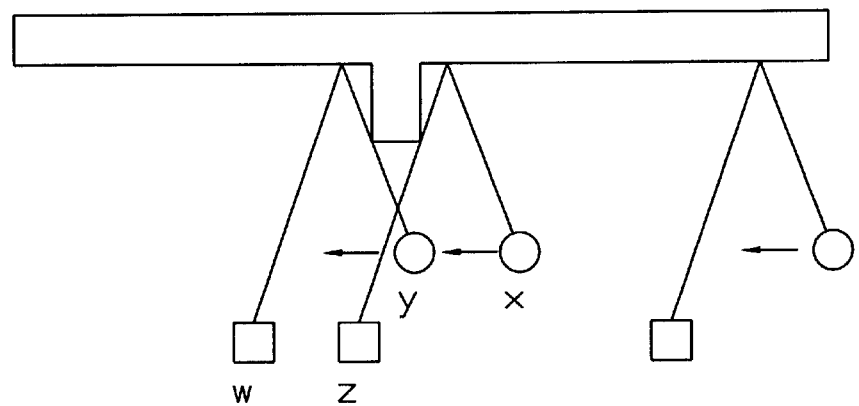
FIG. 5c is a cross section diagram illustrating the shadow region produced by light sensors passing through rib.
Figure 5D:
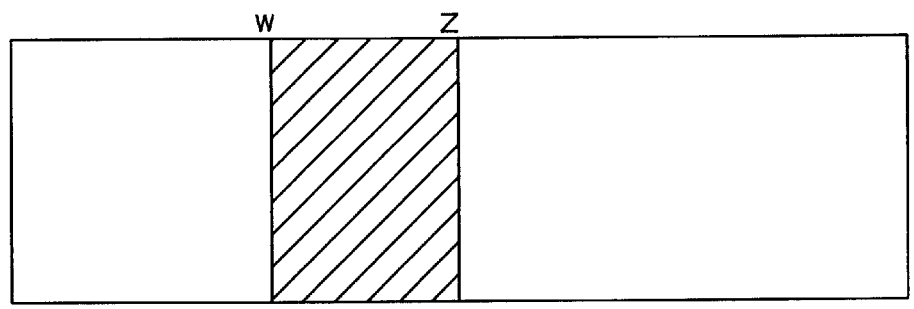
FIG. 5d shows the result of sensors scanning through rib.

When a scanner starting to scan, light source 210 moves from B to B' and photosensor 220 receives signal in-situ, as shown in FIG. 5a. Because rib 180 will generate a drop in elevation, photosensor 220 can not receive any signal from light source 210 from X to Y, as shown in FIG. 5b. FIG. 5c is a cross section diagram illustrating the shadow region produced by photosensor 220 passing through rib 180. When light source 210 from X to Y, rib 180 stops reflected light such that photosensor 220 receives no signal from Z to W. FIG. 5d shows the result of photosensor 220 scanning through the rib 180 and a shadow region scanned from Z to W is the same with prior art. In this embodiment, the border between white and dark can be treated as starting point for scanning.

Figure 6A:
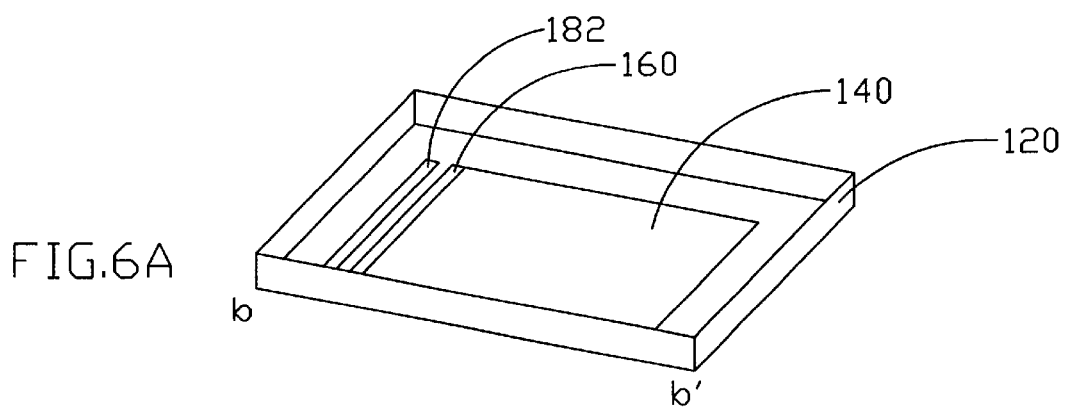
FIG. 6a shows another preferred embodiment of this invention.

The following is another embodiment. FIG. 6a shows another interior structure in housing 120 in which transparent glass 140 is in center, picture for scanning is upward under transparent glass 140, a white calibration area 160 is placed beside transparent glass 140 near B, and a trench 182 is distanced to white calibration area 160.

Figure 6B:
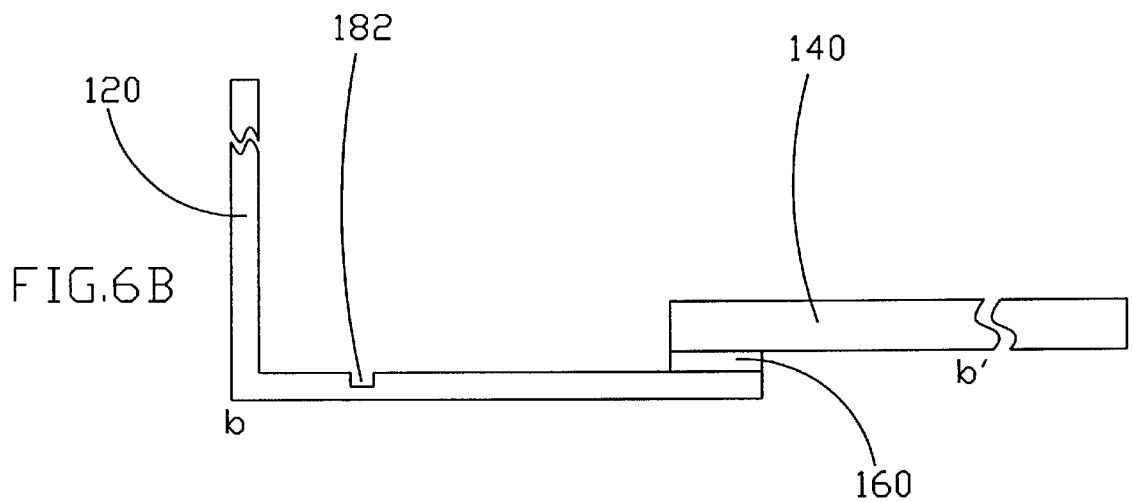
FIG. 6b shows a cross-section diagram of another preferred embodiment of this invention.

Referring to FIG. 6b, a trench 182 that is formed with housing 120 formation is perpendicular to the scanning direction. Transparent glass 140 is placed in the center of housing 120 and a white calibration area is attached below transparent glass 140 near B. Calibrating target is trench 182 plus white calibration area 160 in this embodiment.

Figure 7A:
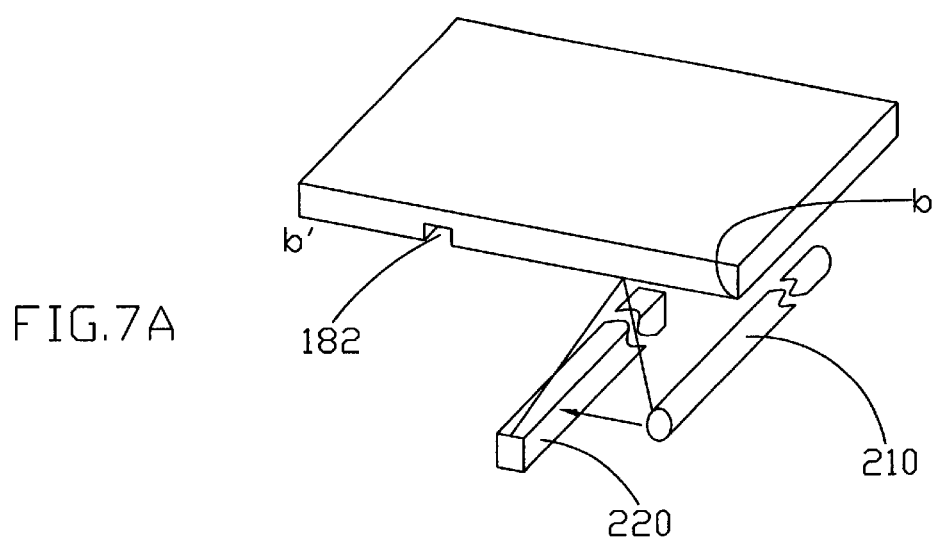
FIG. 7a is a schematic diagram illustrating a scanner in practicing the present invention of another preferred embodiment.
Figure 7B:
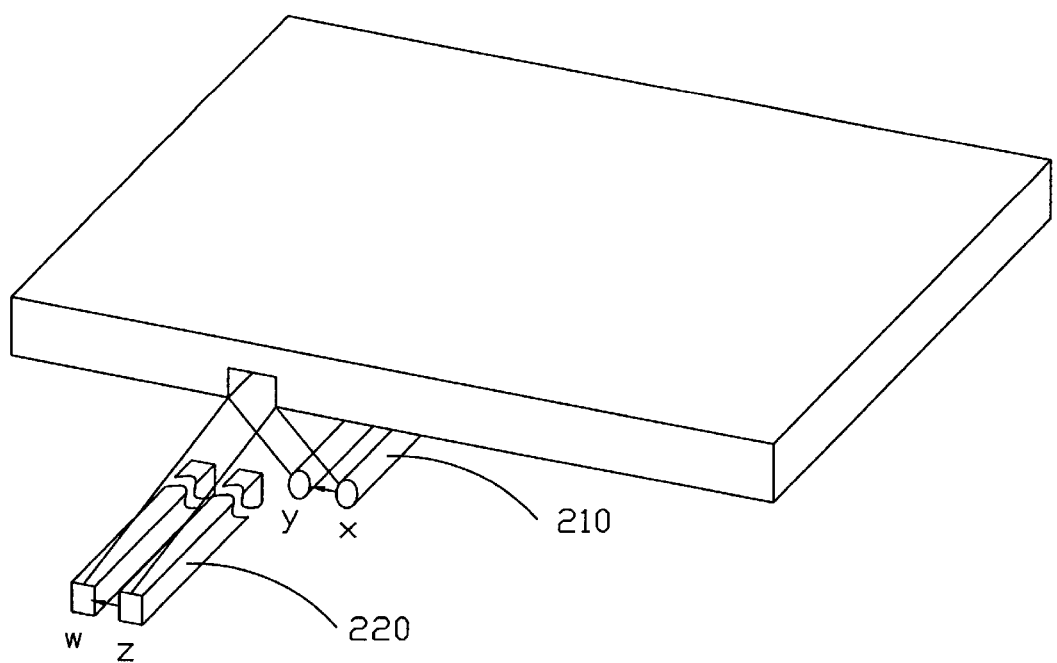
FIG. 7b is a schematic diagram illustrating the shadow region produced by light sensors passing through trench.
Figure 7C:
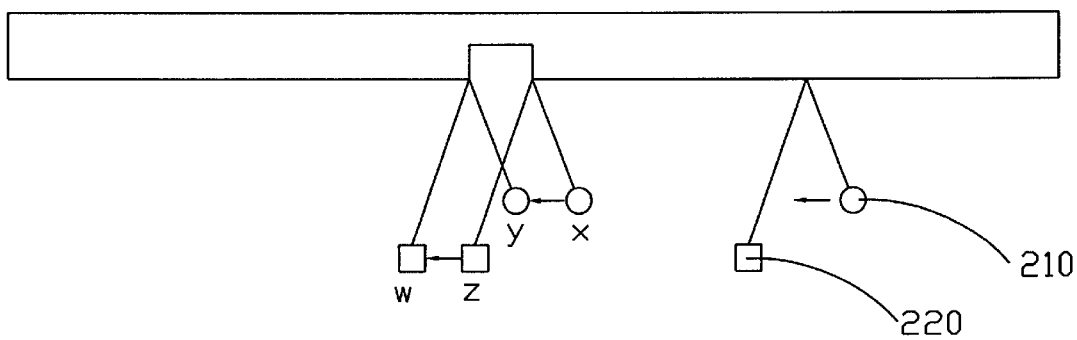
FIG. 7c is a cross section diagram illustrating the shadow region produced by light sensors passing through trench.

When a scanner starting to scan, light source 210 moves from B to B' and photosensor 220 receives signal in-situ, as shown in FIG. 7*a*. Because trench 182 will generate a drop in elevation, photosensor 220 can not receive any signal from light source 210 from X to Y, as shown in FIG. 7*b*. FIG. 7*c* is a cross section diagram illustrating the shadow region produced by photosensor 220 passing through trench 182. When light source 210 from X to Y, trench 182 stops reflected light such that photosensor 220 receives no signal from Z to W. The result of photosensor 220 scanning through the trench 182 is the same with in FIG. 5*d* and a shadow region scanned from Z to W is the same with prior art. Equivalently, the border between white and dark can be treated as starting point for scanning.

The length, width and height of the rib 180 in first embodiment are not important as long as the drop in elevation generated by rib 180 can create shadow region for photosensor 220, similarly for trench 182 in the second embodiment. In this invention, the rib and trench are formed with housing and can get accurate position with prior art. Moreover, white calibrating area is for white calibration so the position of white calibrating area is not important, i.e. it is not important that the white calibrating area lays aslant and rib or trench is located at the front or back of the white calibrating area. In our invention, black bar does not need to be printed on white calibrating area, and can reduce costs.

In the preceding description of invention, any apparatus comprising a cross-sectional area that generates a drop in elevation and creates a border between dark area and light is available. The size of cross-sectional area only affects offset.

Although specific embodiments have been illustrated and described, it will be obvious to those skilled in the art that various modifications may be made without departing from what is intended to be limited solely by the appended claims.

What is claimed is:

1. A calibrating apparatus for calibration before scanning in a scanner, said calibrating apparatus comprising:

a housing for fixing carrying glass;

a rib mounted between a starting region and said carrying glass, axis of said rib being about vertical to scanning direction of the scanner, for generating a drop in elevation; and a white calibrating area located between said carrying glass and said rib for providing white calibration.

2. The apparatus according to claim 1, wherein said rib is formed with said housing formation.

3. The apparatus according to claim 1, wherein shadow region generated by said drop in elevation provides a relative reference for scanner.

4. The apparatus according to claim 1, wherein said housing comprises said carrying glass for supporting documents.

5. A calibrating apparatus for calibration before scanning in scanner, said calibrating apparatus comprising:

a housing for fixing carrying glass;

a trench mounted between a starting region and said carrying glass, axis of said trench being about vertical to scanning direction of the scanner, for generating a drop in elevation; and a white calibrating area located between said carrying glass and said trench for providing white calibration.

6. The apparatus according to claim 5, wherein said trench is formed with said housing formation.

7. The apparatus according to claim 5, wherein shadow region generated by said drop in elevation provides a relative reference for scanner.

8. The apparatus according to claim 5, wherein said housing comprises said carrying glass for supporting documents.

9. A method for operating a calibrating apparatus for a scanner, said method comprising:

illuminating a rib or a trench in housing by a light source, light reflected from the rib or the trench being received and then transformed to a signal by a photosensor;

continuously moving said light source with respect to said rib or said trench such that said photosensor generates a shadow region from reflected light to form a reference border between dark and white portions; and continuously moving said light source with respect to a white calibrating area such that said photosensor will perform a white calibration from reflected light.

10. The method according to claim 9, wherein the sequence of said scanning rib or trench and said scanning white calibrating area can be reversed.

* * * * *